United States Patent
Okayasu

(10) Patent No.: US 10,795,687 B2
(45) Date of Patent: Oct. 6, 2020

(54) INFORMATION PROCESSING SYSTEM FOR SETTING HARDWARE, METHOD FOR SETTING HARDWARE AND NON-TRANSITORY COMPUTER-READABLE STORAGE MEDIUM RECORDING PROGRAM FOR SETTING HARDWARE

(71) Applicant: FUJITSU LIMITED, Kawasaki-shi, Kanagawa (JP)

(72) Inventor: Takanori Okayasu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 16/115,608

(22) Filed: Aug. 29, 2018

(65) Prior Publication Data
US 2019/0079776 A1    Mar. 14, 2019

(30) Foreign Application Priority Data

Sep. 14, 2017    (JP) ................................ 2017-177146

(51) Int. Cl.
*G06F 9/4401*      (2018.01)

(52) U.S. Cl.
CPC .......... *G06F 9/4401* (2013.01); *G06F 9/4411* (2013.01)

(58) Field of Classification Search
CPC combination set(s) only.
See application file for complete search history.

(56) References Cited

U.S. PATENT DOCUMENTS

| 5,428,806 | A | * | 6/1995 | Pocrass | G06F 13/409 |
| | | | | | 710/100 |
| 7,328,261 | B2 | * | 2/2008 | Husain | H04L 41/0853 |
| | | | | | 709/224 |
| 7,818,367 | B2 | * | 10/2010 | Beasley | G06F 3/023 |
| | | | | | 709/203 |
| 10,055,218 | B2 | * | 8/2018 | Hsu | G06F 8/654 |
| 2006/0150023 | A1 | * | 7/2006 | Hasebe | G01R 31/31705 |
| | | | | | 714/38.1 |
| 2007/0136670 | A1 | * | 6/2007 | Broos | G06Q 30/06 |
| | | | | | 715/744 |

(Continued)

FOREIGN PATENT DOCUMENTS

| JP | 07-006114 | 1/1995 |
| JP | 2003-337641 | 11/2003 |

*Primary Examiner* — Raymond N Phan
(74) *Attorney, Agent, or Firm* — Fujitsu Patent Center

(57) ABSTRACT

An information processing system includes a first information processing device, and a second information processing device, wherein the first information processing device includes a first memory that stores first firmware in which first setting information related to a first setting of first hardware of the first information processing device is recorded, and a first processor configured to generate, by executing the first firmware, data including the first setting information recorded in the first firmware, and the second information processing device includes a second memory that stores second firmware for reproducing the first setting in setting processing of second hardware of the second information processing device based on the first setting information included in the generated data, and a second processor configured to reproduce, by executing the second firmware, the first setting based on the first setting information in the setting processing of the second hardware.

18 Claims, 14 Drawing Sheets

(56) References Cited

U.S. PATENT DOCUMENTS

| | | | | |
|---|---|---|---|---|
| 2010/0287623 A1* | 11/2010 | Banik | ............... | G06F 8/61 |
| | | | | 726/30 |
| 2011/0119664 A1* | 5/2011 | Kimura | ............... | G06F 8/60 |
| | | | | 717/173 |
| 2017/0046151 A1* | 2/2017 | Hsu | ............... | G06F 9/44505 |
| 2018/0131574 A1* | 5/2018 | Jacobs | ............... | H04L 67/22 |

* cited by examiner

FIG. 3

| SETTING FILE | | |
|---|---|---|
| HEADER INFORMATION FOR SEARCH | PRE-CHANGE SETTING INFORMATION | POST-CHANGE SETTING INFORMATION |
| SETTING NAME FOR DISPLAY<br>DATE AND TIME OF CREATION<br>EXPANSION CARD INFORMATION<br>... | SCREEN ID, NAME<br>ITEM ID, NAME, VALUE<br>ITEM ID, NAME, VALUE<br>ITEM ID, NAME, VALUE<br>SCREEN ID, NAME<br>ITEM ID, NAME, VALUE<br>... | SCREEN ID, NAME<br>SET ITEM ID, NAME, VALUE<br>SET ITEM ID, NAME, VALUE<br>SET ITEM ID, NAME, VALUE<br>GENERATED DIALOG MESSAGE<br>SELECTED OPERATIONS<br>SET ITEM ID, NAME, VALUE<br>OPERATION FOR SCREEN TRANSITION<br>SCREEN ID, NAME<br>... |

FIG. 5

| DISPLAY CHARACTER STRING | CHARACTER STRING ID |
|---|---|
| RAID SETTING | 1 |
| CREATE VIRTUAL DISK | 2 |
| SELECT DISKS FOR RAID | 3 |
| DISK1 | 4 |
| DISK2 | 5 |
| DISK3 | 6 |
| DISK4 | 7 |
| DISK5 | 8 |
| DISK6 | 9 |
| SELECT VIRTUAL DISK | 10 |
| VIRTUAL-1 | 11 |
| VIRTUAL-2 | 12 |
| RAID LEVEL | 13 |
| RAID-0 | 14 |
| RAID-1 | 15 |
| RAID-5 | 16 |
| RAID-6 | 17 |

FIG. 6

| SETTING FILE | | |
|---|---|---|
| HEADER INFORMATION FOR SEARCH | PRE-CHANGE SETTING INFORMATION | POST-CHANGE SETTING INFORMATION |
| FILE INFO | MENU ID : xxxxx-xx-xx-xx-xxx | |
| · NAME : SERVER A_xxx/xx | MENU NAME : RAID SETTING | |
| · DATE : xxxx/xx/xx | | |
| | MENU INFO | |
| CARD INFO | 1 : RAID SETTING | |
| · VENDER : xx/xx | 2 : CREATE VIRTUAL DISK | |
| · TYPE  : xxx | 4 : DISK1 : 0 | |
| · DISK   : DISK1 : 100GB | 5 : DISK2 : 0 | |
| : DISK2 / 100GB | 6 : DISK3 : 0 | |
| : DISK3 / 100GB | 7 : DISK4 : 0 | |
| : DISK4 / 100GB | 8 : DISK5 : 0 | |
| : DISK5 / 100GB | 9 : DISK6 : 0 | |
| : DISK6 / 100GB | | |
| | OPERATION | |
| | | |

FIG. 10

| SETTING FILE | | |
|---|---|---|
| HEADER INFORMATION FOR SEARCH | PRE-CHANGE SETTING INFORMATION | POST-CHANGE SETTING INFORMATION |
| FILE INFO | MENU ID : xxxxx-xx-xx-xx-xxx | MENU ID : xxxxx-xx-xx-xx-xxx |
| · NAME : SERVER A_xxx/xx | MENU NAME : RAID SETTING | MENU NAME : RAID SETTING |
| · DATE : xxxx/xx/xx | | |
| | MENU INFO | MENU INFO |
| CARD INFO | 1 : RAID SETTING | 1 : RAID SETTING |
| · VENDER : xx/xx | 2 : CREATE VIRTUAL DISK | 10 : SELECT VIRTUAL DISK:VIRTUAL-1 |
| · TYPE : xxx | 4 : DISK1 : 0 | 11 : RAID LEVEL:RAID-1 |
| · DISK : DISK1 : 100GB | 5 : DISK2 : 0 | 2 : CREATE VIRTUAL DISK |
| : DISK2 / 100GB | 6 : DISK3 : 0 | 6 : DISK3 : 0 |
| : DISK3 / 100GB | 7 : DISK4 : 0 | 7 : DISK4 : 0 |
| : DISK4 / 100GB | 8 : DISK5 : 0 | 8 : DISK5 : 0 |
| : DISK5 / 100GB | 9 : DISK6 : 0 | 9 : DISK6 : 0 |
| : DISK6 / 100GB | OPERATION | OPERATION |
| | | 2 : CREATE VIRTUAL DISK |
| | | 4 : DISK1 : 1 |
| | | 5 : DISK2 : 1 |
| | | 1 : RAID SETTING |
| | | 10 : SELECT VIRTUAL DISK:VIRTUAL-1 |
| | | 11 : RAID LEVEL:RAID-1 |

FIG. 11

| SETTING FILE | | |
|---|---|---|
| HEADER INFORMATION FOR SEARCH | PRE-CHANGE SETTING INFORMATION | POST-CHANGE SETTING INFORMATION |
| FILE INFO | MENU ID : xxxxx-xx-xx-xx-xxx | |
| • NAME : SERVER A_xxx/xx | MENU NAME : RAID SETTING | |
| • DATE : xxxx/xx/xx | | |
| | MENU INFO | |
| CARD INFO | 1 : RAID SETTING | |
| • VENDER : xx/xx | 10 : SELECT VIRTUAL DISK:VIRTUAL-1 | |
| • TYPE : xxx | 11 : RAID LEVEL:RAID-1 | |
| • DISK : DISK1 : 100GB | 2 : CREATE VIRTUAL DISK | |
| : DISK2 / 100GB | 6 : DISK3 : 0 | |
| : DISK3 / 100GB | 7 : DISK4 : 0 | |
| : DISK4 / 100GB | 8 : DISK5 : 0 | |
| : DISK5 / 100GB | 9 : DISK6 : 0 | |
| : DISK6 / 100GB | | |
| | OPERATION | |
| | 2 : CREATE VIRTUAL DISK | |
| | 4 : DISK1 : 1 | |
| | 5 : DISK2 : 1 | |
| | 1 : RAID SETTING | |
| | 10 : SELECT VIRTUAL DISK:VIRTUAL-1 | |
| | 11 : RAID LEVEL:RAID-1 | |

INFORMATION PROCESSING SYSTEM FOR SETTING HARDWARE, METHOD FOR SETTING HARDWARE AND NON-TRANSITORY COMPUTER-READABLE STORAGE MEDIUM RECORDING PROGRAM FOR SETTING HARDWARE

CROSS-REFERENCE TO RELATED APPLICATION

This application is based upon and claims the benefit of priority of the prior Japanese Patent Application No. 2017-177146, filed on Sep. 14, 2017, the entire contents of which are incorporated herein by reference.

FIELD

The embodiments discussed herein are related to an information processing system, a method and a non-transitory computer-readable storage medium.

BACKGROUND

For an information processing device such as a server or the like, various kinds of settings on hardware such as an expansion card or the like incorporated in the information processing device may be made before shipment. In addition, a program for making such settings may be executed on an operating system (OS) executed on the information processing device. A technology is proposed which stores contents of settings made within the program on a storage medium incorporated in the information processing device, and executes hardware settings using the stored setting contents. Prior art documents include Japanese Laid-open Patent Publication No. 07-6114 and Japanese Laid-open Patent Publication No. 2003-337641.

SUMMARY

According to an aspect of the embodiments, an information processing system includes a first information processing device, and a second information processing device, wherein the first information processing device includes a first memory configured to store first firmware in which first setting information related to a first setting of first hardware of the first information processing device is recorded, and a first processor coupled to the first memory and configured to generate, by executing the first firmware, data including the first setting information recorded in the first firmware, and the second information processing device includes a second memory configured to store second firmware for reproducing the first setting in setting processing of second hardware of the second information processing device based on the first setting information included in the generated data, and a second processor coupled to the second memory and configured to reproduce, by executing the second firmware, the first setting based on the first setting information in the setting processing of the second hardware.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a configuration of a setting file according to the one embodiment;

FIG. 5 is a diagram illustrating an example of correspondence relations between character strings to be displayed on a BIOS screen and character string identifiers (IDs) according to the one embodiment;

FIG. 6 is a diagram illustrating an example of a setting file created in a server according to the one embodiment;

FIG. 10 is a diagram illustrating an example of another state of the setting file in FIG. 6, the setting file being created in the server according to the one embodiment;

FIG. 11 is a diagram illustrating an example of yet another state of the setting file in FIG. 6, the setting file being created in the server according to the one embodiment;

DESCRIPTION OF EMBODIMENTS

Because the program for making the hardware settings is executed on the OS, there is a possibility that the license cost of the OS used in the information processing device may be incurred, and that a processing time involved in starting the OS may become a bottleneck in setting work.

Figure 1:
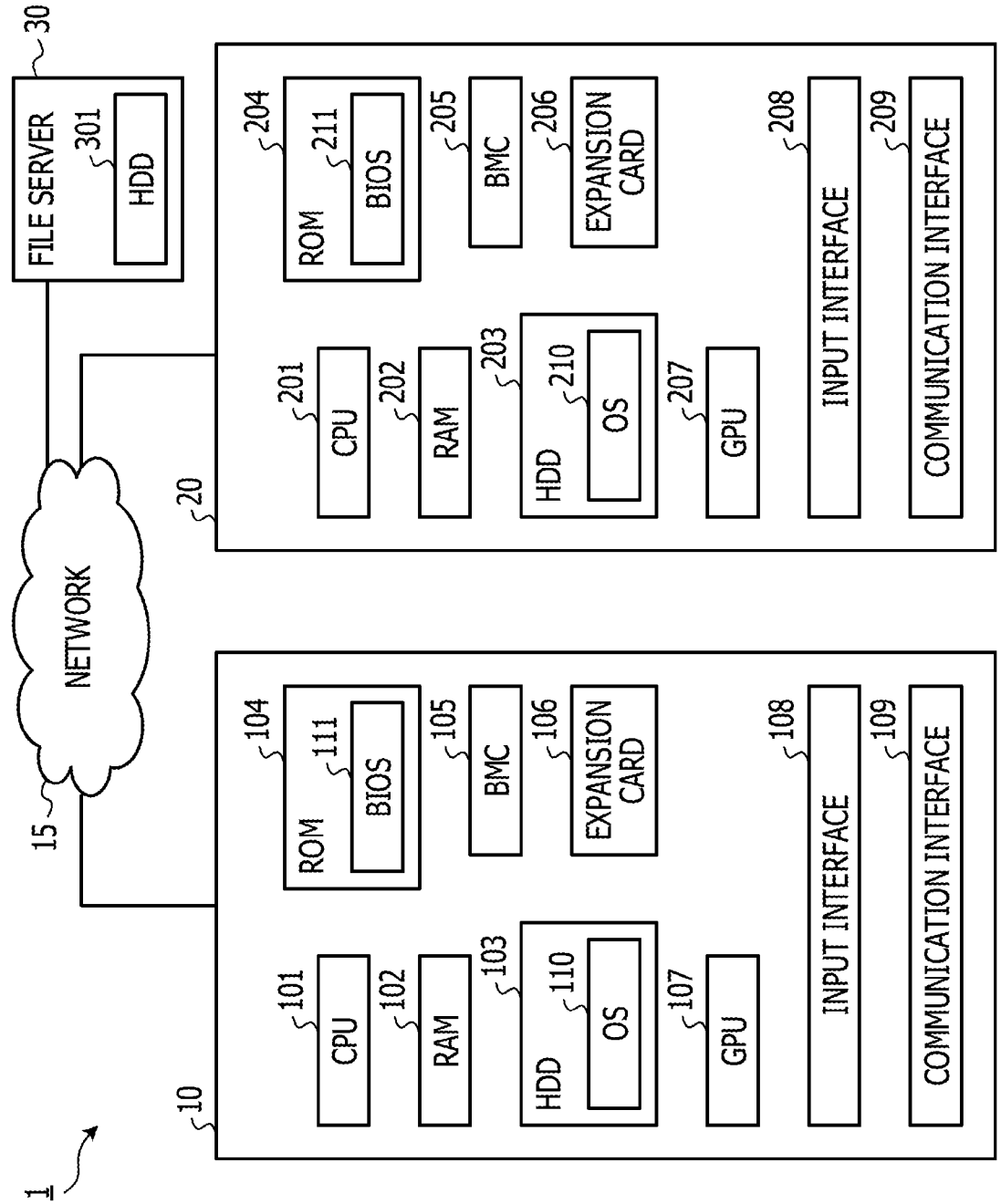
FIG. 1 is a diagram illustrating an example of a configuration of an information processing system according to one embodiment.

FIG. 1 illustrates an example of a configuration of an information processing system 1 in one embodiment. The information processing system 1 includes servers 10 and 20, a network 15, and a file server 30. Incidentally, the servers 10 and 20 are an example of an information processing device. In addition, the file server 30 is an example of a storage device that stores data. The server 10 includes a central processing unit (CPU) 101, a random access memory (RAM) 102, a hard disk drive (HDD) 103, a read-only memory (ROM) 104, a BMC 105, and an expansion card 106. The server 10 further includes a graphics processing unit (GPU) 107, an input interface 108, and a communication interface 109.

In addition, the server 20 includes a CPU 201, a RAM 202, an HDD 203, a ROM 204, a BMC 205, an expansion card 206, a GPU 207, an input interface 208, and a communication interface 209. Incidentally, because the parts of the server 20 correspond to the respective parts of the server 10, the following description will be made of the parts of the server 10, and description of the parts of the server 20 will be omitted.

The server 10 retains a BIOS 111 on the ROM 104, and retains an OS 110 on the HDD 103. Incidentally, the ROM 104 is an example of a first storage unit that stores first firmware, and the ROM 204 is an example of a second storage unit that stores second firmware. In addition, the CPU 101 is an example of a first executing unit that executes the first firmware, and the CPU 201 is an example of a second executing unit that executes the second firmware. The GPU 107 is coupled to a monitor not illustrated in the figures. In addition, the input interface 108 is coupled to an input device not illustrated in the figures. In addition, the communication interface 109 is coupled to the network 15. A user performs various operations on the server 10 by operating the input device. In addition, a processing result in the server 10 is displayed on the monitor.

In the present embodiment, the BIOS 111 is compliant with unified extensible firmware interface (UEFI) specifications. The UEFI specifications are specifications defining a software interface between an OS and firmware. The UEFI specifications provide the BIOS 111 with a setting menu for setting hardware within the server 10. In addition, the BIOS 111 obtains information on items settable in the setting menu from the hardware. Consequently, when the BIOS 111 is started, the user may make settings of the expansion card 106 on the BIOS screen of the BIOS 111. In addition, the BIOS 111 may transmit information on the settings of the expansion card 106, the settings being made by the user, to the BMC 105. Incidentally, the BIOS 111 is an example of the first firmware capable of obtaining the information on the settings of the hardware.

When the server 10 is started, the server 10 initializes each part by the BIOS 111. In addition, the BMC 105 controls a remote power supply of the server 10 and monitors the hardware within the server 10 based on intelligent platform management interface (IPMI) specifications. The BMC 105 includes a CPU and a memory separately from the server 10, and operates on an OS different from the OS 110. In addition, the BMC 105 communicates with each part of the server 10 according to the specifications of an interface compliant with IPMI.

As an example, the BMC 105 includes a keyboard controller style (KCS) interface, and communicates with the CPU 101 via an input/output (I/O) device of the server 10. In addition, the server 10 manages each part of hardware within the server 10 according to the standard of an interface compliant with IPMI. IPMI is a standardized message-based hardware management interface. The server 10 obtains information of the BMC 105 via the BIOS 111 and an IPMI driver. Hence, the server 10 communicates with the BMC 105 by an IPMI command via an interface such as KCS, system management interface chip (SMIC), block transfer (BT), or the like according to the OS 110 or the BIOS 111.

The BMC 105 is an example of a management controller. The BMC 105 communicates with each part of hardware within the server 10 by management component transport protocol (MCTP), for example. The management controller manages the state of the server 10 and obtains statistical information by MCTP, and retains management parameters. Cited as an example of the management parameters are the processing speed of the server 10, a power state, a CPU utilization rate, the link state of a transmission line, an error count of each part of hardware, and the like. Hence, the management controller integrates the management parameters from one or a plurality of monitoring target devices by MCTP. Then, the management controller allows local and remote information processing devices and another management controller to access the above-described management parameters.

Figure 2:
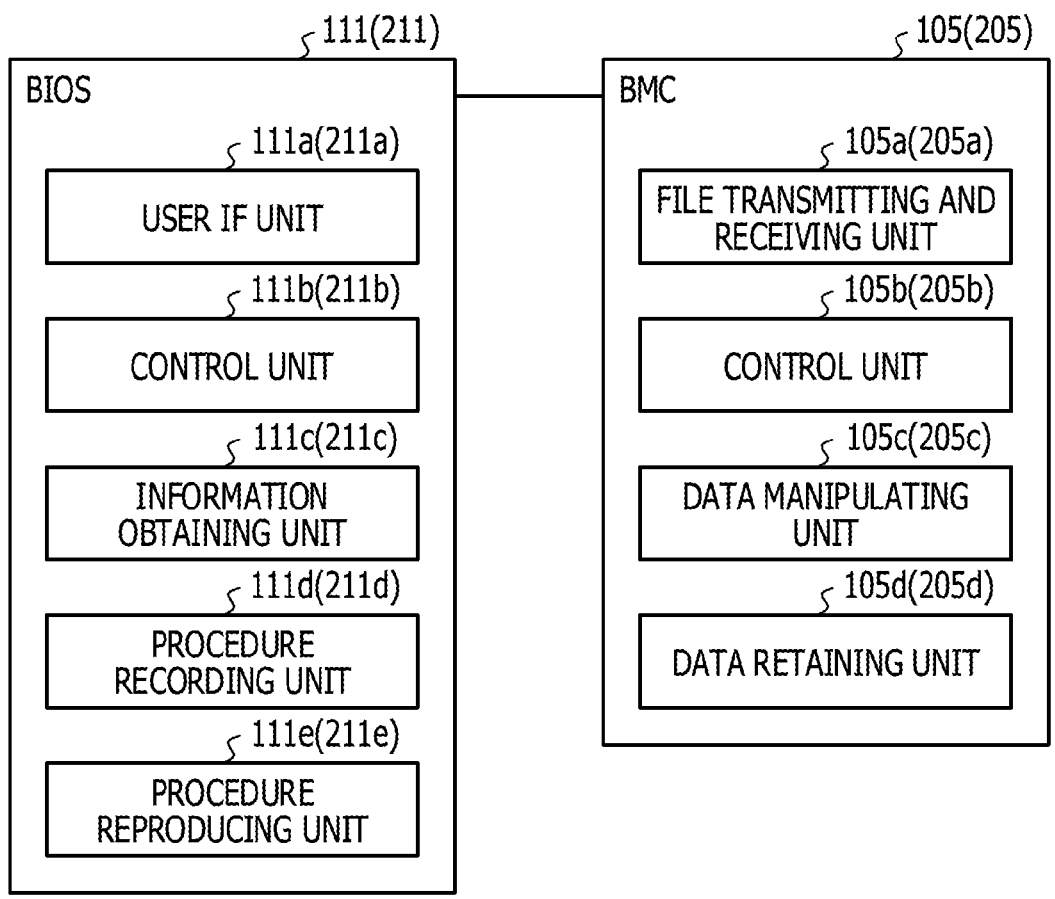
FIG. 2 is a diagram illustrating an example of a configuration of a basic input output system (BIOS) and a baseboard management controller (BMC) according to the one embodiment.

FIG. 2 illustrates an example of a configuration of processing units that perform the processing of the BIOS 111 and the BMC 105 in the server 10. The BIOS 111 is firmware stored in the ROM 104. The CPU 101 executes a program included in the BIOS as each processing unit illustrated in FIG. 2. As illustrated in FIG. 2, the BIOS 111 includes a user interface (IF) unit 111*a*, a control unit 111*b*, an information obtaining unit 111*c*, a procedure recording unit 111*d*, and a procedure reproducing unit 111*e*.

The user interface unit 111*a* displays a BIOS screen on the monitor, and receives input from the user. The control unit 111*b* controls transfer of a setting file used for setting the expansion card 106 to and from the BMC 105, input from the user, and the like. Incidentally, the control unit 111*b* is an example of an obtaining unit that obtains data. The information obtaining unit 111*c* obtains configuration information of the hardware within the server 10 and present setting information of the expansion card 106. The procedure recording unit 111*d* records operations performed by the user on the BIOS screen. Incidentally, the procedure recording unit 111*d* is an example of a recording unit that records content and a procedure of settings of the hardware of the information processing device. The procedure reproducing unit 111*e* makes settings of firmware of the expansion card 106 by reproducing the operations of the user on the BIOS screen, the operations being recorded by the procedure recording unit 111*d*. Incidentally, the procedure reproducing unit 111*e* is an example of a reproducing unit that makes settings of the hardware of the information processing device by reproducing the content according to the procedure based on setting information included in the obtained data.

In addition, the BMC 105 includes a CPU and a memory not illustrated in the figures. The CPU of the BMC 105 executes a program expanded in an executable manner in the memory of the BMC 105 as each processing unit illustrated in FIG. 2. As illustrated in FIG. 2, the BMC 105 includes a file transmitting and receiving unit 105*a*, a control unit 105*b*, a data manipulating unit 105*c*, and a data retaining unit 105*d*.

The file transmitting and receiving unit 105*a* transmits and receives the setting file to and from the BIOS 111 and the file server 30. The control unit 105*b* controls the transfer of the setting file to and from the BIOS 111 and the file server 30, inputs from the user, and the like. The data manipulating unit 105*c* obtains the setting information of the expansion card 106 from the BIOS 111, and creates the setting file. Incidentally, the data manipulating unit 105*c* is an example of a data creating unit that creates data including the setting information indicating the recorded content and procedure of the settings of the hardware. The data retaining unit 105*d* retains the setting file created by the data manipulating unit 105*c*. In addition, the file server 30 includes an HDD 301 that stores the setting file.

FIG. 3 illustrates an example of information of the setting file created in the present embodiment. As illustrated in FIG. 3, the setting file includes three kinds of information including header information for search, pre-change setting information, and post-change setting information. The header information for search is information identifying the expansion card, such as a kind, a manufacturer, and the like of the expansion card 106. The header information for search includes a file name of the setting file, a date and time of creation of the setting file, information used to identify the expansion card 106, and the like. Incidentally, the header information for search is an example of identification information of the hardware. In addition, the information included in the header information for search will hereinafter be referred to as "configuration information" of the expansion card 106.

In addition, the pre-change setting information is information including the present setting information of the firmware of the expansion card 106, and is used to determine whether or not the setting file may be applied to firmware of another expansion card. The pre-change setting information includes a screen ID and a screen name for identifying each setting screen in the BIOS screen. The BIOS 111 identifies the setting screen by the screen ID. In addition, the BIOS 111 displays the screen name corresponding to the identified setting screen on the BIOS screen. In addition, the pre-change setting information includes, for example, an item ID for identifying each setting item set on the BIOS screen, the name of the setting item, and a set value. The BIOS 111 identifies the setting item by the item ID. In addition, the BIOS 111 displays the setting item name corresponding to the identified setting item on the BIOS screen. In addition, the BIOS 111 makes a setting of the setting item according to the set value. Incidentally, the pre-change setting information is an example of pre-recording information that indicates a setting of the hardware of the information processing device before a recording unit records the content and procedure of the setting of the hardware.

In addition, the post-change setting information is information including setting changes that the user makes to the firmware of the expansion card 106 in the BIOS 111 and a change procedure of the setting changes. The procedure reproducing unit 111e of the BIOS 111 reproduces settings of the firmware by using the post-change setting information. The post-change setting information includes information indicating the screen ID and name of each setting screen on which the user changes a setting in the BIOS screen, the item ID, name, and set value of each setting item, the content of an operation performed when the user changes the setting, and a message displayed on the screen when the user changes the setting. Incidentally, the information on the hardware settings that the user makes in the BIOS 111 will hereinafter be referred to as "setting information." In addition, the information included in the pre-change setting information is an example of setting information before the setting changes in the expansion card 106. In addition, the information included in the post-change setting information is an example of setting information after the setting changes in the expansion card 106.

First Example

Description will next be made of processing performed in the server 10 when the user makes settings of the expansion card 106 in a first example of the present embodiment. In the present embodiment, a case is assumed in which, as an example, the user makes a redundant arrays of inexpensive disks (RAID) setting for the firmware of the expansion card 106 by the BIOS 111. In addition, in the first example, it is assumed that the servers 10 and 20 and the file server 30 are coupled to the network 15. It is further assumed that settings applied to one of the expansion card 106 and the expansion card 206 are also applicable to the other.

In addition, in the present embodiment, when the user makes a setting of the expansion card 106, a setting file including information indicating setting content is created by the BMC 105. When the user then makes a setting of the expansion card 206, the setting file created by the BMC 105 is used. The setting content included in the setting file is automatically applied to the expansion card 206. The user may therefore make the setting of the expansion card 206 without manually repeating the setting made on the expansion card 106. Incidentally, suppose in the present embodiment that the setting file for the expansion card 106 is not created in the server 10.

Figure 4:
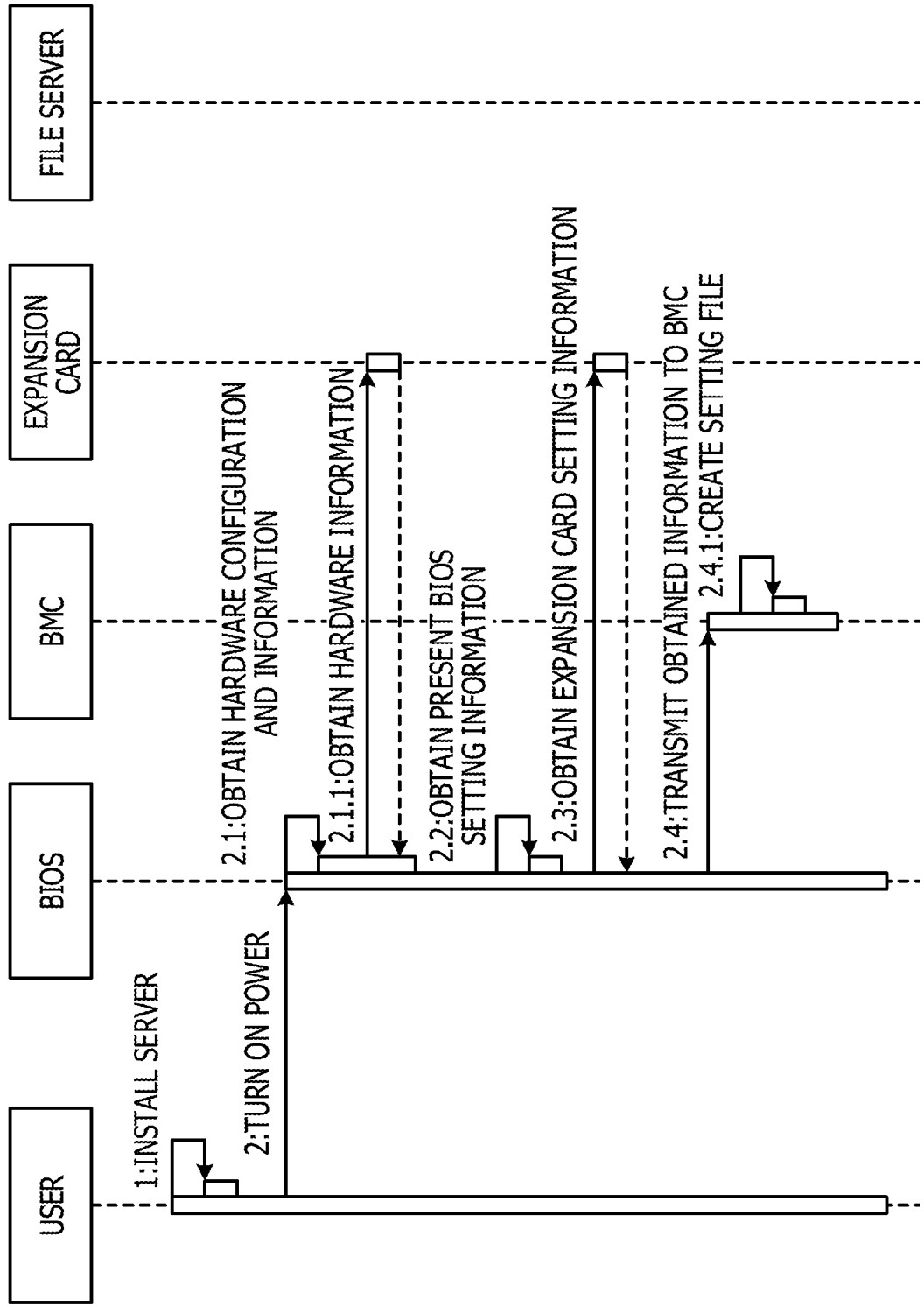
FIG. 4 is a diagram illustrating an example of a flow of processing performed in the information processing system according to the one embodiment.

FIG. 4 illustrates an example of a flow of processing performed in the information processing system 1 when the setting file for the expansion card 106 is not created. First, the user of the server 10 installs the server 10, and prepares a usage environment of the server 10 ("1" in FIG. 4). When the user completes the preparation of the usage environment of the server 10, the user turns on power to the server 10 ("2" in FIG. 4). When the power to the server 10 is turned on, the BIOS 111 is started. The BIOS 111 then obtains configuration information from the expansion card 106 as hardware within the server 10 ("2. 1" and "2. 1. 1" in FIG. 4). Incidentally, the configuration information obtained by the BIOS 111 in 2. 1 and 2. 1. 1 is information included in the above-described header information for search.

Next, the BIOS 111 obtains setting information of the hardware of the expansion card 106 ("2. 2" and "2. 3" in FIG. 4). Incidentally, the setting information obtained by the BIOS 111 in 2. 2 and 2. 3 is information included in the above-described pre-change setting information. In addition, in 2. 2 and 2. 3, the BIOS 111 also obtains information on correspondence relations between character strings to be displayed on the BIOS screen and character string IDs identifying the character strings from the expansion card 106.

FIG. 5 illustrates an example of the information indicating the correspondence relations between the character strings to be displayed on the BIOS screen and the character string IDs. As illustrated in FIG. 5, a character string ID is associated with each character string to be displayed on the BIOS screen. The BIOS 111 identifies the character strings to be displayed on the BIOS screen from the character string IDs within the setting file and the above-described correspondence relations.

Next, the BIOS 111 transmits the configuration information and the setting information obtained in 2. 1 to 2. 3 to the BMC 105 ("2. 4" in FIG. 4). Then, the BMC 105 creates a setting file by using the configuration information and the setting information of the expansion card 106, the configuration information and the setting information being received from the BIOS 111 ("2. 4. 1" in FIG. 4). The BMC 105 stores the received configuration information of the expansion card 106 as "header information for search" in the setting file for the expansion card 106. In addition, the BMC 105 stores the received setting information of the expansion card 106 as "pre-change setting information" in the setting file. Hence, as illustrated in FIG. 6, the setting file created by the BMC 105 in 2. 4. 1 stores the configuration information and the setting information as the "header information for search" and the "pre-change setting information," respectively, and does not store any information as "post-change setting information."

In the setting file for the expansion card 106, the setting file being illustrated in FIG. 6, the information of an item "NAME" in the file information ("FILE INFO" in FIG. 6) of the "header information for search" is an identification name used to identify the setting file. The information of the item "NAME" includes the server name of the server creating the setting file and a date and time of creation. In addition, the information of an item "Date" in the file information of the "header information for search" is a date and time of update of the setting file. When information within the setting file is updated, the date and time of the item "Date" is updated.

The information of an item "VENDER" in expansion card information ("CARD INFO" in FIG. 6) of the "header information for search" is an identification name used to identify a manufacturer of the expansion card 106. The information of an item "TYPE" is an identification name used to identify a card type of the expansion card 106. The information of an item "DISK" is information on physical disks to be controlled by the expansion card 106.

In addition, the information of an item "MENU ID" in the "pre-change setting information" is an identification name used to identify a setting menu of the expansion card 106 in the BIOS 111. The information of an item "MENU NAME" is a menu name displayed on the BIOS screen of the setting menu indicated by the item "MENU ID." Further, menu information ("MENU INFO" in FIG. 6) indicates items for which the user may make a setting on the menu. In the example illustrated in FIG. 6, the menu information includes display names ("1: RAID SETTING" and "2: CREATE VIRTUAL DISK" in FIG. 6) and setting contents ("4: DISK1: 0," "5: DISK2: 0," "6: DISK3: 0," "7: DISK4: 0," "8: DISK5: 0," and "9: DISK6: 0" in FIG. 6) on the BIOS screen. As an example, "4" in "4: DISK1: 0" denotes a character string ID, "DISK1" denotes a character string corresponding to the character string ID, and "0" denotes a present value. "0" or "1" is stored as the present value. "0" denotes that the corresponding logic disk is not selected as a logic disk used in RAID. "1" denotes that the corresponding logic disk is selected as a logic disk used in RAID. Hence, in the example illustrated in FIG. 6, it is understood that none of logic disks "DISK1" to "DISK9" is selected as a logic disk used in RAID.

Figure 7:
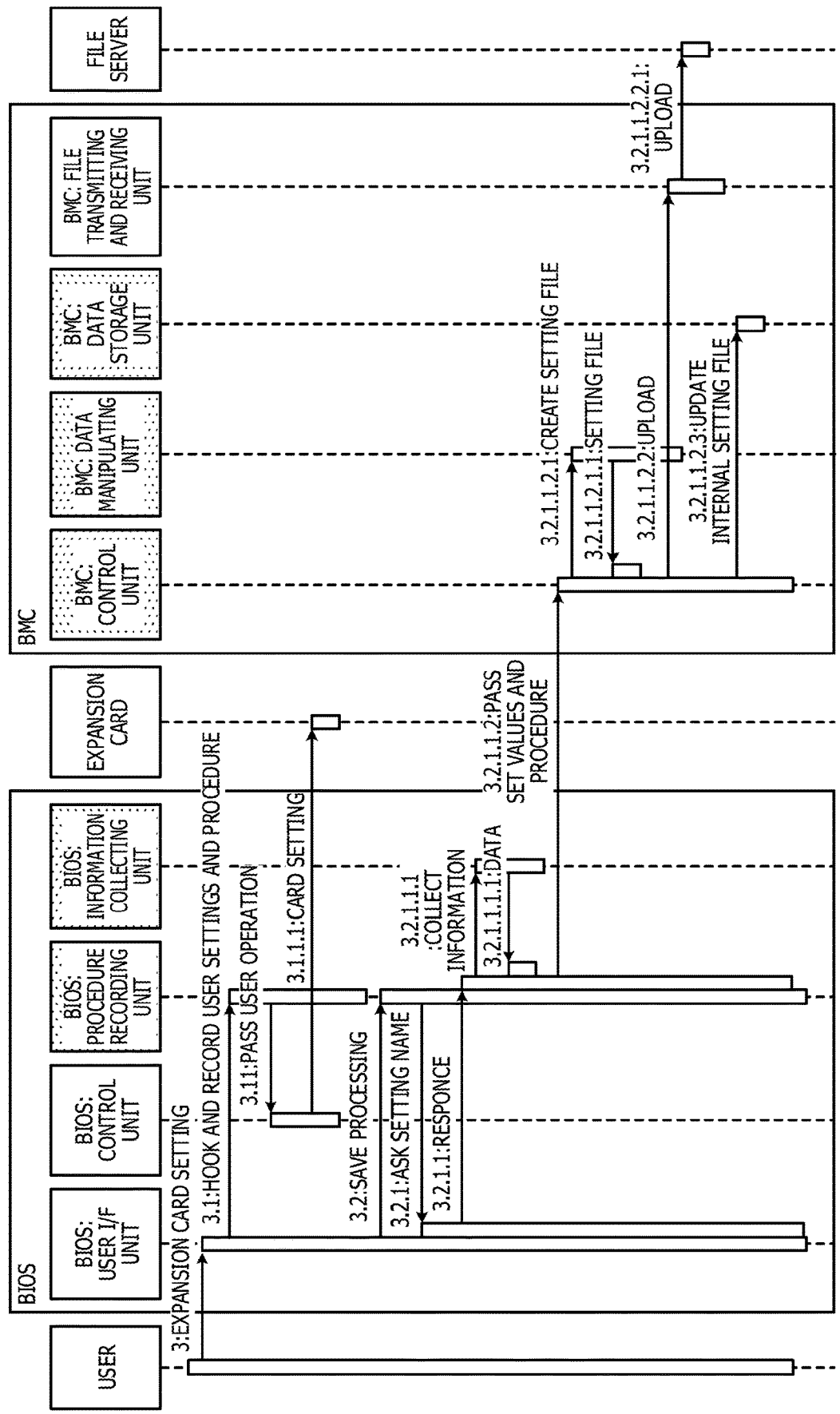
FIG. 7 is a diagram illustrating an example of a flow of processing performed in the information processing system according to the one embodiment after the processing of FIG. 4.
Figure 8:
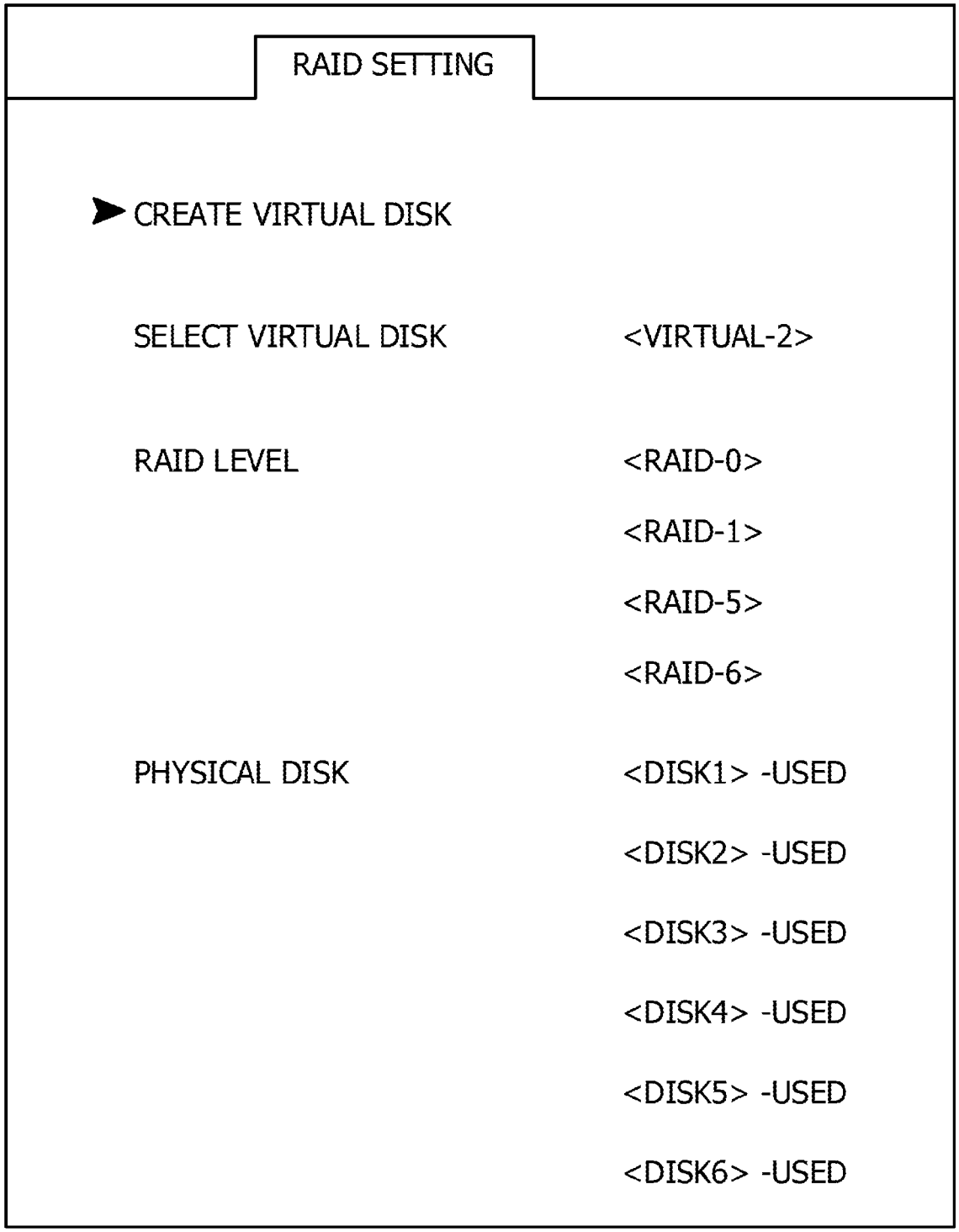
FIG. 8 is a diagram illustrating an example of a BIOS screen displayed by the server according to the one embodiment.

Next, after the processing illustrated in FIG. 4, the user starts the BIOS 111 of the server 10, and changes settings of the expansion card 106. FIG. 7 illustrates an example of a flow of processing performed in the information processing system 1 when the user changes settings of the expansion card 106 by the BIOS 111. The user gives the BIOS a setting instruction for the expansion card 106 by operating the input device coupled to the server 10. The BIOS 111 receives the operation of the setting instruction from the user via the user IF unit 111a, and displays the setting menu of the expansion card 106 on the BIOS screen according to the instruction ("3" in FIG. 7). FIG. 8 illustrates an example of display of the setting menu of the expansion card 106 in the BIOS screen. The user may make settings of the expansion card 106 by making a setting for each item displayed on the BIOS screen. As illustrated in FIG. 8, the user may select four items "CREATE VIRTUAL DISK," "SELECT VIRTUAL DISK," "RAID LEVEL," and "PHYSICAL DISKS" on the BIOS screen.

The item "CREATE VIRTUAL DISK" is an item for selecting physical disks used in RAID among physical disks within the server 10. The user selects the item "CREATE VIRTUAL DISK," and selects physical disks. A logic disk in which the selected physical disks are abstracted is thereby created. The item "SELECT VIRTUAL DISK" is an item for selecting a logic disk for which to make settings among already created logic disks. The item "RAID LEVEL" is an item for selecting the RAID level of the logic disk selected in the item "SELECT VIRTUAL DISK." "PHYSICAL DISKS" is an item indicating usage conditions of the physical disks controlled by the expansion card 106.

Figure 9:
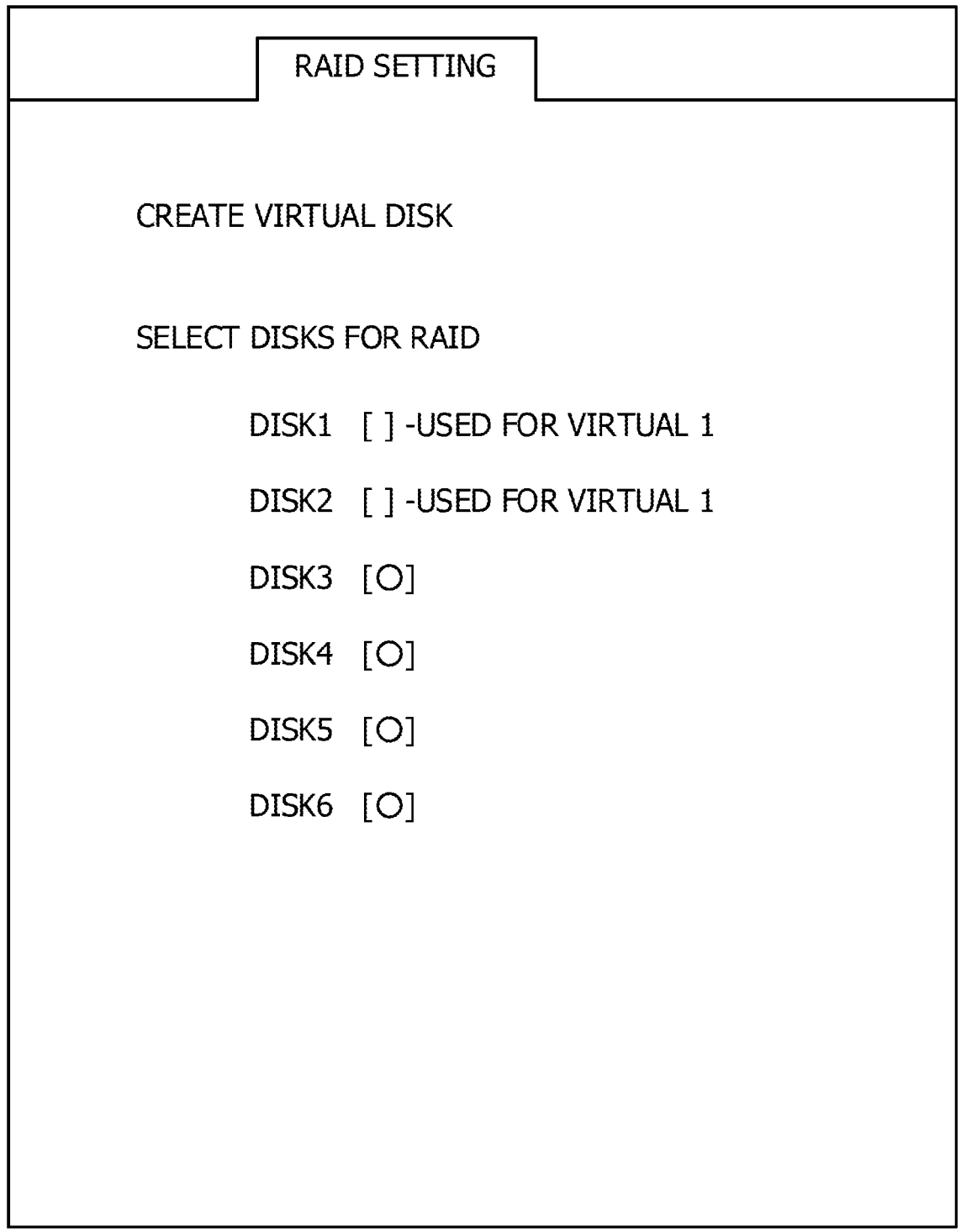
FIG. 9 is a diagram illustrating an example of another BIOS screen displayed by the server according to the one embodiment.

Next, the user changes settings of the expansion card 106 by operating the setting menu of the BIOS screen. As an example, the user performs operations to be described in the following. First, the user moves to a "RAID SETTING" screen (FIG. 8), and selects the item "CREATE VIRTUAL DISK." Then, the user selects "DISK1" and "DISK2" as physical disks to be used. A logic disk (referred to as "VIRTUAL1") in which the physical disks are abstracted is thereby created. The user returns to the "RAID SETTING" screen, selects the item "SELECT VIRTUAL DISK," selects the created logic disk ("Virtual1"), selects "RAID1" in the item "RAID LEVEL," and stores the contents of the settings made. FIG. 9 illustrates an example of the "RAID SETTING" screen displayed when the above-described settings are made.

In the present embodiment, during the above-described user operations, the procedure recording unit 111d of the BIOS 111 records the operations related to the setting changes in the expansion card 106, the setting changes being made by the user on the BIOS screen ("3. 1" in FIG. 7). Information indicating the operations performed by the user is passed from the procedure recording unit 111d to the control unit 111b ("3. 1. 1" in FIG. 7). Then, the control unit 111b sets the expansion card 106 according to the operations performed by the user ("3. 1. 1. 1" in FIG. 7).

When the user performs the processing of storing the setting contents changed by making the setting changes ("3. 2" in FIG. 7), the procedure recording unit 111d requests the user to input a name (identification name of the item "NAME" in the "header information for search") for the latest setting changes ("3. 2. 1" in FIG. 7). Incidentally, the name input by the user in 3. 2 becomes the file name of the setting file. The identification name of the item "NAME" in the "header information for search" of the setting file is updated by the name input by the user. When the user does not input the name, the BIOS 111 creates a name by using the name of the server 10 and a date and time that the settings are stored or the like, and updates the identification name of the item "NAME" by the created name ("3. 2. 1. 1" in FIG. 7).

Further, the procedure recording unit 111d of the BIOS 111 instructs the information obtaining unit 111c to obtain the setting information after the changes from the expansion card 106 ("3. 2. 1. 1. 1" in FIG. 7). The information obtaining unit 111c obtains the setting information after the changes in the expansion card 106, and transmits the setting information to the procedure recording unit 111d ("3. 2. 1. 1. 1" in FIG. 7). Then, the procedure recording unit 111d transmits, to the BMC 105, the information on the user operations recorded in "3. 1" and information indicating the setting contents after the changes, the setting contents being obtained from the information obtaining unit 111c in "3. 2. 1. 1. 1," for example, the present setting contents ("3. 2. 1. 1. 2" in FIG. 7).

Next, the control unit 105b of the BMC 105 instructs the data manipulating unit 105c to add the information received from the BIOS 111 to the setting file for the expansion card 106, the setting file being created in the processing of FIG. 4 and retained by the data retaining unit 105d of the BMC 105 ("3. 2. 1. 1. 2. 1" in FIG. 7). The data manipulating unit 105c processes the setting file according to the instruction of the control unit 105b, and transmits the setting file to the control unit 105b ("3. 2. 1. 1. 2. 1. 1" in FIG. 7). Then, the control unit 105b transmits the setting file for the expansion card 106 to the file server 30 via the file transmitting and receiving unit 105a ("3. 2. 1. 1. 2. 2" and "3. 2. 1. 1. 2. 2. 1" in FIG. 7). In addition, the control unit 105b also stores the transmitted setting file in the data retaining unit 105d ("3. 2. 1. 1. 2. 3" in FIG. 7). The file server 30 stores the received setting file for the expansion card 106 on the HDD 301.

FIG. 10 illustrates an example of the setting file for the expansion card 106, the setting file being created by the above-described processing of "3. 2. 1. 1. 2. 1." Incidentally, the information of "header information for search" and "pre-change setting information" of the setting file illustrated in FIG. 10 is the same as the information illustrated in FIG. 6. The above-described processing "4" adds the information indicating the setting contents after the changes and the information on the recorded user operations to the "post-change setting information" of the setting file. The information of an item "MENU ID" in the "post-change setting information" is an identification name used to identify the setting menu of the expansion card 106 in the BIOS 111. The information of an item "MENU NAME" is a menu name displayed on the BIOS screen of the setting menu indicated by the item "MENU ID." In addition, an item "MENU INFO" includes the information on the setting contents after the changes. Further, an item "OPERATION" includes the information indicating the stored user operations. In addition, the item "OPERATION" indicates the user operations in order from a top in time series.

In the case of the example illustrated in FIG. 10, the user first performs an operation indicated by "2: CREATE VIRTUAL DISK," for example, moves to a "CREATE VIRTUAL DISK" screen (whose screen ID is "2"). Next, the user performs an operation indicated by "4: DISK1: 1," for example, selects the item "DISK1" (whose character string ID is "4"). Next, the user performs an operation indicated by "5: DISK2: 1," for example, selects the item "DISK2" (whose character string ID is "5"). Then, the user performs an operation indicated by "1: RAID SETTING," for example, moves to the "RAID SETTING" screen (whose screen ID is "1"). Next, the user performs an operation indicated by "10: SELECT VIRTUAL DISK: VIRTUAL-1," for example, selects "VIRTUAL-1" in the item "SELECT VIRTUAL DISK" (whose character string ID is "10"). Then, the user performs an operation indicated by "11: RAID LEVEL: RAID-1," for example, selects "RAID-1" in the item "RAID LEVEL" (whose character string ID is "11").

When the setting changes in the expansion card 106, the setting changes being made by the user after the user starts the BIOS 111, are reproduced, the order of the operations performed by the user for the setting contents after the changes is not clear with only the setting contents, and thus there is a possibility that the setting contents after the changes may not be reproduced correctly. Accordingly, in the present embodiment, the operations performed by the user are stored in time series in the item "OPERATION" of the setting file. Thus, when another expansion card is set by using the setting file, the setting contents after the changes, the setting contents being stored in the setting file, are reproduced properly.

After the setting file is transmitted to the file server 30, the control unit 111b of the BIOS 111 overwrites the information of the "pre-change setting information" with the information of the "post-change setting information" of the setting file ("6" in FIG. 7), and deletes the information of the "post-change setting information" ("7" in FIG. 7). FIG. 11 illustrates a state of the setting file after the processing indicated by "6" is performed in the case where the setting file has the contents illustrated in FIG. 10. Thus, even when the user makes setting changes by the BIOS 111 again, the setting contents related to the new changes are stored in the "post-change setting information" by repeating the above processing.

Figure 12:
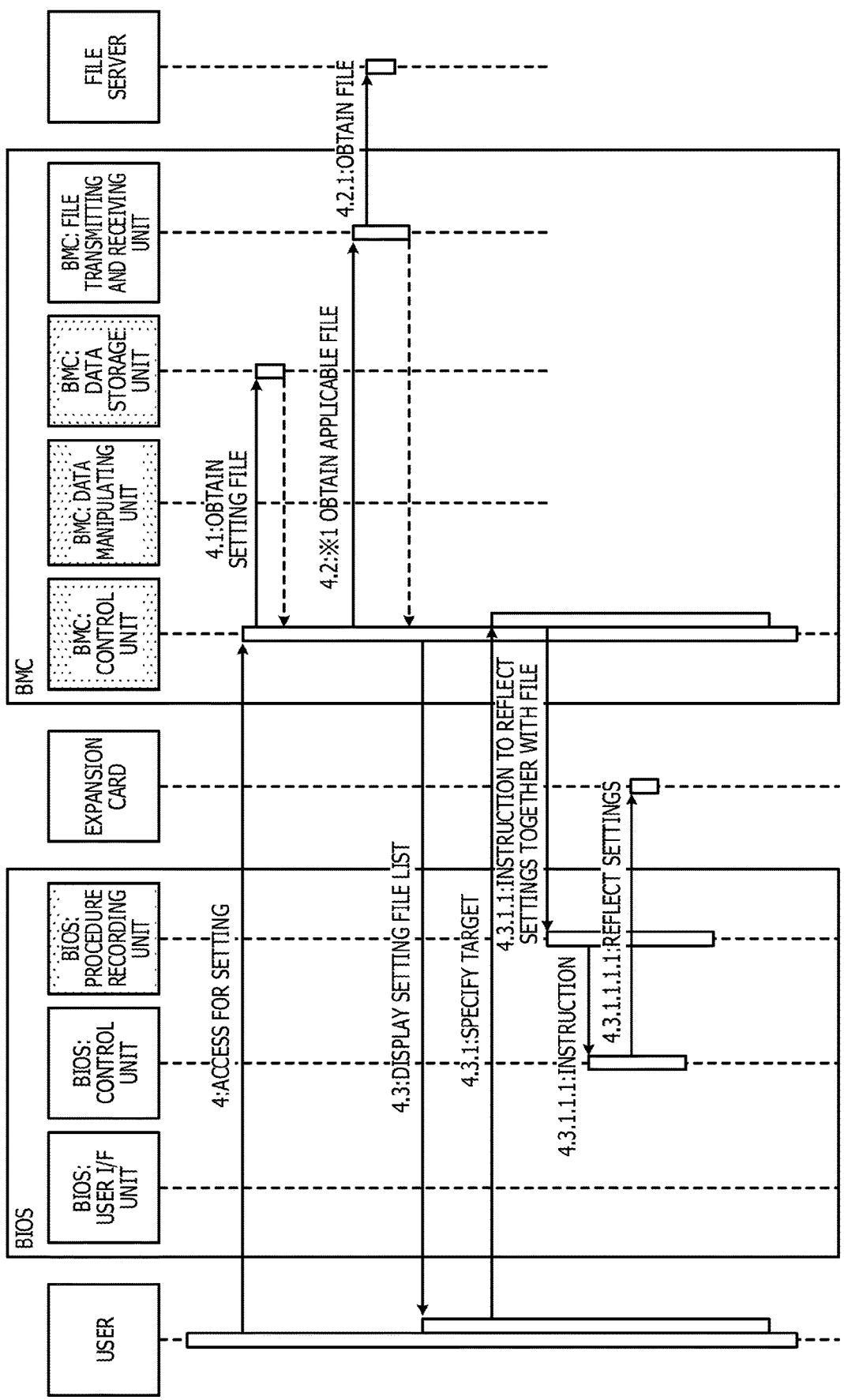
FIG. 12 is a diagram illustrating an example of a flow of processing performed in the information processing system according to the one embodiment after the processing of FIG. 7.

Next, after the processing illustrated in FIG. 7, the user sets the expansion card 206 of the server 20 by using the setting file stored in the file server 30 by the above processing. FIG. 12 illustrates an example of a flow of processing performed in the information processing system 1 when the user sets the expansion card 206. Incidentally, suppose here that a setting file for the expansion card 206 is already created in the server 20 by performing the processing illustrated in FIG. 4, and that the created setting file is stored in a data retaining unit 205d.

The user accesses the BMC 205 by operating the input device coupled to the input interface of the server 20 ("4" in FIG. 12). The user performs an operation of instructing the BMC 205 to set the expansion card 206. A control unit 205b of the BMC 205 obtains the setting file stored in the data retaining unit 205d from the data retaining unit 205d ("4. 1" in FIG. 12). Then, the control unit 205b inquires of the file server 30 via a file transmitting and receiving unit 205a about presence on the HDD 301 of a setting file including card information indicated by the "header information for search" of the setting file obtained in "4. 1" and setting contents indicated by the "pre-change setting information" of the setting file ("4. 2" and "4. 2. 1" in FIG. 12). The file server 30 searches for the setting file according to the inquiry from the control unit 205b, and transmits information on a pertinent setting file to the file transmitting and receiving unit 205a. Incidentally, when there is a plurality of pertinent setting files on the HDD 301, the file server 30 transmits information on each of the pertinent setting files to the file transmitting and receiving unit 205a. The control unit 205b receives the information on the setting file from the file server 30 via the file transmitting and receiving unit 205a. Here, the information on the setting file is information used to create a list to be displayed in 4. 3 in the following. What kind of information to use to create the list may be determined as appropriate.

The control unit 205b creates the list of the setting file(s) received from the file server 30, and displays the list on a monitor coupled to the GPU 207 ("4. 3" in FIG. 12). The user checks the list displayed on the monitor, and selects a setting file to be used to set the expansion card 206 ("4. 3. 1" in FIG. 12). The control unit 205b obtains the setting file selected by the user from the file server 30 via the file transmitting and receiving unit 205a. Then, the control unit 205b transmits setting contents (information of the item "MENU INFO" in the example of FIG. 10) and a setting procedure (information of the item "OPERATION" in the example of FIG. 10) included in the "post-change setting information" of the obtained setting file to a procedure reproducing unit 211e of a BIOS 211 ("4. 3. 1. 1" in FIG. 12). Incidentally, the BIOS 211 is an example of the second firmware.

The procedure reproducing unit 211e instructs a control unit 211b to set the expansion card 206 according to the setting contents and the setting procedure received from the control unit 205b ("4. 3. 1. 1. 1" in FIG. 12). The control unit 211b sets the expansion card 206 according to the instruction from the procedure reproducing unit 211e ("4. 3. 1. 1. 1" in FIG. 12). When the control unit 211b completes the setting of the expansion card 206, the control unit 211b notifies the control unit 205b of the BMC 205 of the completion of the setting processing. The control unit 205b displays, on the monitor, a message notifying the completion of the setting of the expansion card 206.

Thus, according to the present embodiment, in the case where an expansion card is incorporated in each of the plurality of servers within the information processing system, a setting file indicating setting contents is created when settings of the expansion card of one of the servers are made. Then, the settings may be applied to setting of the expansion card of the other server by reproducing the settings using the created setting file. Consequently, a reduction in a work load involved in the settings may be expected as compared with a case where the expansion card of each of the servers is set manually. In addition, the setting file related to the settings made on the expansion card by the user is created by the BIOS without the OS being started in the server, and the settings indicated by the setting file are applied to the other expansion card. Thus, the setting of the expansion card may be made without an OS environment being constructed in the server including the expansion card as a setting target. Therefore, the present embodiment enables hardware settings without fears of the trouble of constructing the OS environment in the server and cost associated with the license of the OS.

Further, the setting file includes the header information for search. Thus, even when a plurality of setting files are created within the information processing system, it is possible to determine accurately whether or not hardware setting contents included in a setting file are applicable to hardware as a setting target. Further, because the setting file includes the pre-change setting information, the accuracy of the above-described determination may be further improved by using the header information for search and the pre-change setting information. In addition, the setting file is stored in the file server separate from the servers, and the setting file may therefore be managed collectively within the information processing system. Thus, the processing of setting each piece of hardware using the setting file may be expected to be performed more smoothly.

Second Embodiment

Figure 13:
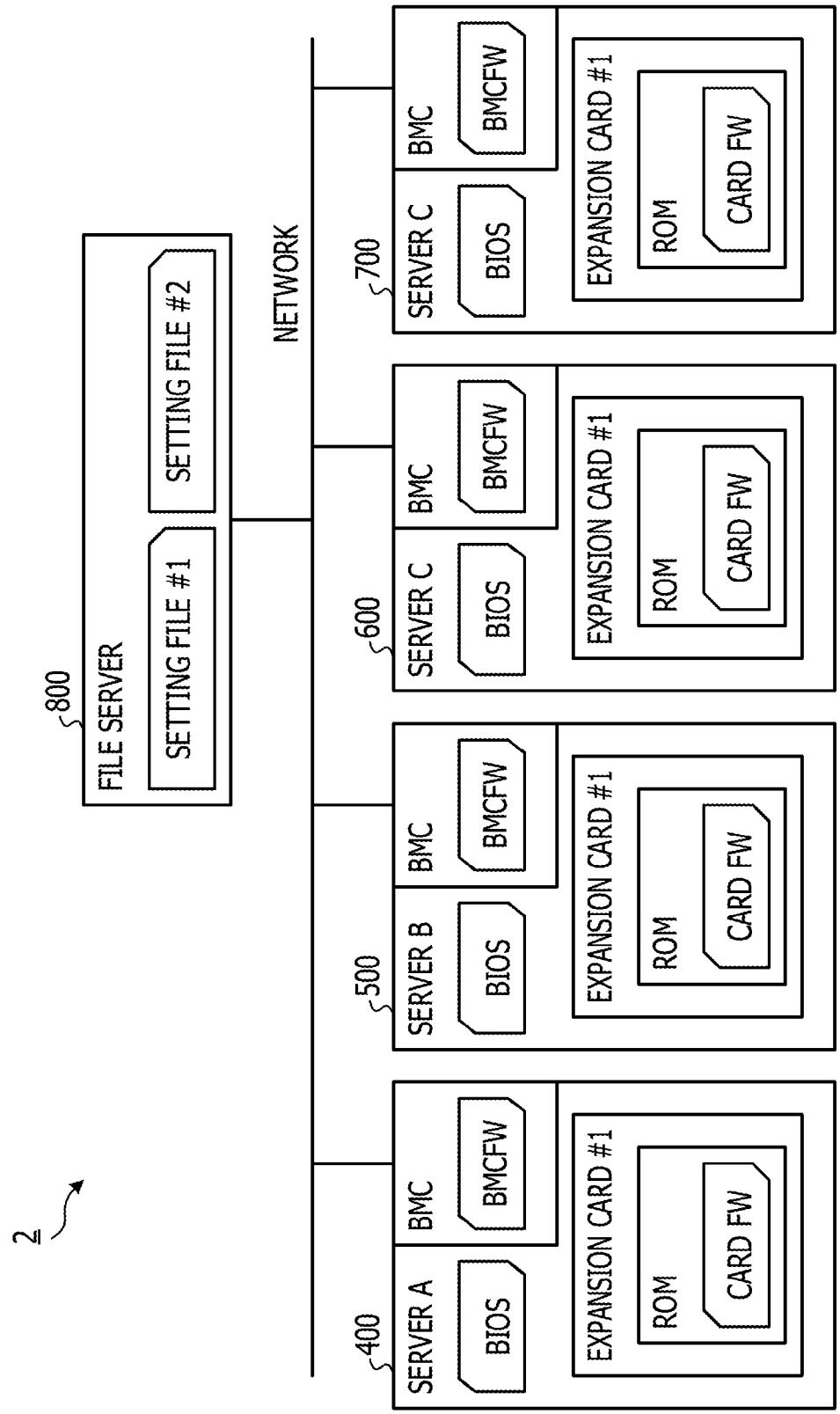
FIG. 13 is a diagram illustrating an example of a configuration of an information processing system according to another embodiment.

A second embodiment will next be described with reference to FIG. 13. In the second embodiment, an information processing system 2 is provided therewithin with four servers including a server A 400, a server B 500, a server C 600, and a server D 700 as well as a file server 800. The server A 400, the server B 500, the server C 600, and the server D 700 include the same constituent elements as the servers 10 and 20 described above, and each include an expansion card #1. Incidentally, suppose that the expansion cards #1 of the server A 400, the server B 500, the server C 600, and the server D 700 each include identical firmware. In addition, in the second embodiment, a user makes different settings on the respective expansion cards #1 of two servers.

First, the user makes a first setting on the expansion card #1 of the server A 400. Processing performed in the information processing system 2 in the setting of the expansion card #1 is the same as in the first example, and therefore detailed description thereof will be omitted here. As a result of the user making the first setting, a setting file related to the first setting ("setting file 1" in FIG. 13) is stored on an HDD of the file server 800. Next, the user makes a second setting on the expansion card #1 of the server B 500. As in the case where the first setting is made, a setting file related to the second setting ("setting file 2" in FIG. 13) is stored on the HDD of the file server 800. As a result, two setting files related to the expansion cards #1 are present in the file server 800.

Suppose that the user then applies the first or second setting to the remaining servers including the server C 600 and the server D 700. In this case, when the user accesses the BMC of the server C 600 or the server D 700 to which the setting is intended to be applied, two setting files (the "setting file #1" and the "setting file #2") are displayed in a list of applicable setting files according to the processing of the foregoing first example. Then, the user may make the setting on the expansion card #1 of each of the server C 600 and the server D 700 by selecting the setting file #1 or the setting file #2.

Thus, in the present embodiment, even when the user makes different settings on two expansion cards #1, the user may select which setting to apply when setting another expansion card #1.

Third Embodiment

Figure 14:
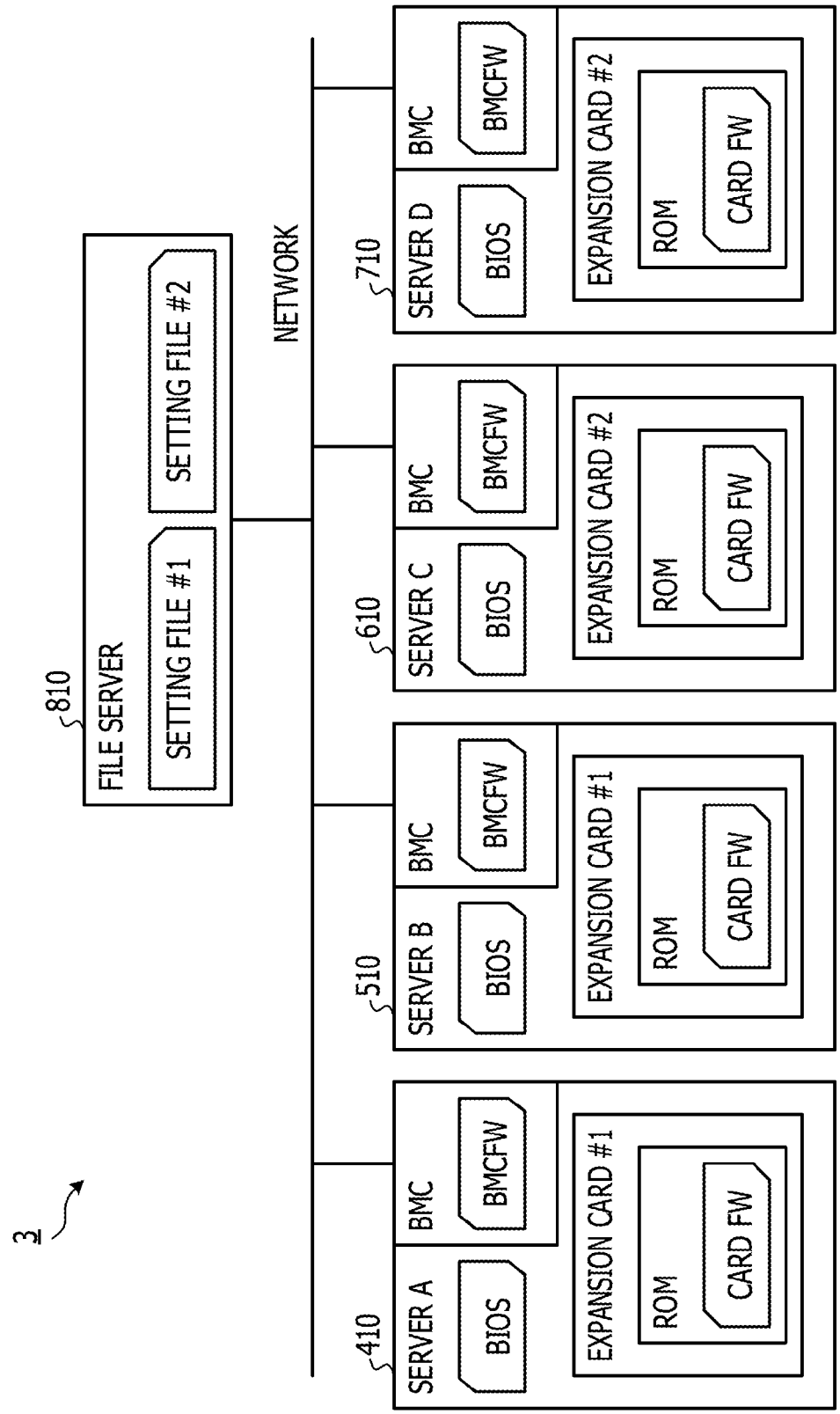
FIG. 14 is a diagram illustrating an example of a configuration of an information processing system according to yet another embodiment.

A third embodiment will next be described with reference to FIG. 14. In the third embodiment, an information processing system 3 is provided therewithin with four servers including a server A 410, a server B 510, a server C 610, and a server D 710 as well as a file server 810. The server A 410, the server B 510, the server C 610, and the server D 710 include the same constituent elements as the servers 10 and 20 described above. In addition, the server A 410 and the server B 510 include an expansion card #1, and the server C 610 and the server D 710 include an expansion card #2. Incidentally, suppose that firmware of the expansion card #1 of the server A 410 and firmware of the expansion card #1 of the server B 510 are identical to each other, and that firmware of the expansion card #2 of the server C 610 and firmware of the expansion card #2 of the server D 710 are identical to each other.

First, a user makes a first setting on the expansion card #1 of the server A 410. Processing performed in the information processing system 3 in the setting of the expansion card #1 is the same as in the first example, and therefore detailed description thereof will be omitted here. As a result of the user making the first setting, a setting file related to the first setting ("setting file 1" in FIG. 14) is stored on an HDD of the file server 810. Next, the user makes a second setting on the expansion card #2 of the server C 610. As in the case where the first setting is made, a setting file related to the second setting ("setting file 2" in FIG. 14) is stored on the HDD of the file server 810. As a result, the setting file #1 related to the expansion card #1 and the setting file #2 related to the expansion card #2 are present in a file server 800.

Suppose that the user then makes a setting on the expansion card #1 of the server B 510. In this case, when the user accesses the BMC of the server B 510, a list indicating the setting file ("setting file #1") for the expansion card #1 is displayed as an applicable setting file list on a monitor according to the processing of the foregoing first example. Incidentally, at this time, the setting file ("setting file #2") for the expansion card #2 is not included in the list. This is because the setting file included in the list is determined based on the "header information for search" and the "pre-change setting information." For example, when the setting of the expansion card #1 is made, the setting file for the expansion card #2 is not selected as a setting file to be included in the list. The reverse is also true. Then, the user may select the setting file #1 for the expansion card #1 of the server B 510, and make a setting on the expansion card #1.

Suppose that the user next makes a setting on the expansion card #2 of the server D 710. In this case, when the user accesses the BMC of the server D 710, a list indicating the setting file ("setting file #2") for the expansion card #2 is displayed as an applicable setting file list on the monitor according to the processing of the foregoing first example. Incidentally, at this time, the setting file ("setting file #1") for the expansion card #1 is not included in the list. Then, the user may select the setting file #2 for the expansion card #2 of the server D 710, and make a setting on the expansion card #2.

Thus, in the present embodiment, even in the case where the user makes respective settings on two different expansion cards #1 and #2, the user may select an appropriate setting file for each of the other expansion cards #1 and #2 when setting the other expansion cards.

In the first example, instead of obtaining the setting file for the expansion card 106 from the file server 30, the BMC 205 of the server 20 may obtain the setting file from the data retaining unit 105*d* of the BMC 105 of the server 10.

In addition, in the foregoing embodiments, at least a part of the foregoing processing may be performed by a processor other than the CPU, for example, a dedicated processor such as a digital signal processor (DSP), a GPU, a numerical processor, a vector processor, an image processing processor, or the like. In addition, at least a part of the foregoing processing may be an integrated circuit (IC) or another digital circuit. In addition, an analog circuit may be included in at least a part of each unit described above. The integrated circuit includes a large-scale integration (LSI), an application specific integrated circuit (ASIC), and a programmable logic device (PLD). The PLD includes, for example, a field-programmable gate array (FPGA). Each unit described above may be a combination of a processor and an integrated circuit. The combination is referred to as, for example, a microcontroller (MCU), a system-on-a-chip (SoC), a system LSI, a chip set, or the like.

<Computer Readable Recording Medium>

A program for implementing a management tool, an OS, or the like for making settings of the above-described servers in a computer or another machine or device (hereinafter a computer or the like) may be recorded on a recording medium readable by the computer or the like. Then, the functions of the program may be provided by making the computer or the like read the program on the recording medium and execute the program.

Here, the recording medium readable by the computer or the like refers to a recording medium that accumulates information such as data, a program, and the like by electric, magnetic, optical, mechanical, or chemical action, and allows the information to be read from the computer or the like. Recording media removable from the computer or the like among such recording media include, for example, a flexible disk, a magneto-optical disk, a compact disc (CD)-ROM, a CD-rewritable (R/W), a digital versatile disc (DVD), a Blu-ray Disk, a digital audiotape (DAT), an 8-mm tape, and a memory card such as a flash memory or the like. In addition, there are a hard disk, a ROM, and the like as recording media fixed to the computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
    a first information processing device; and
    a second information processing device,
    the first information processing device includes:
        a first memory configured to store first firmware in which first setting information related to a first setting of first hardware of the first information processing device is recorded; and
        a first processor coupled to the first memory and configured to generate, by executing the first firmware, data including the first setting information recorded in the first firmware, and
    the second information processing device includes:
        a second memory configured to store second firmware for reproducing the first setting in setting processing of second hardware of the second information processing device based on the first setting information included in the generated data; and
        a second processor coupled to the second memory and configured to reproduce, by executing the second firmware, the first setting based on the first setting information in the setting processing of the second hardware,
    the second processor is configured not to start an operating system (OS) in the setting processing.

2. The information processing system according to claim 1, wherein the data includes identification information of the first hardware, the identification information being recorded in the first firmware, and the second processor is configured to:
    determine, based on the identification information, whether the first setting is applicable to the setting processing of the second hardware; and
    reproduce the first setting based on the first setting information in the setting processing of the second hardware when the first setting is applicable to the setting processing of the second hardware.

3. The information processing system according to claim 1, further comprising:
    a third memory configured to store the data, wherein the second processor is configured to obtain the data from the third memory by executing the second firmware.

4. The information processing system according to claim 1, wherein the first setting information indicates a setting content and a setting procedure of the first hardware, and the second processor is configured to reproduce the setting content according to the setting procedure by executing the second firmware.

5. The information processing system according to claim 1, wherein the first firmware and the second firmware are each a basic input output system (BIOS).

6. The information processing system according to claim 2, wherein the data further includes second setting information indicating a second setting of the first hardware before the first setting information is recorded in the first firmware, and the second processor is configured to determine, based on the identification information and the second setting information, whether the second setting is applicable to the setting processing of the second hardware.

7. The information processing system according to claim 5, wherein the BIOS is compliant with a unified extensible firmware interface (UEFI).

8. A method executed by an information system including a first information processing device and a second information processing device, the method comprising:
  storing, in a first memory of the first information processing device, first firmware in which first setting information related to a first setting of first hardware of the first information processing device is recorded;
  generating, by executing the first firmware, data including the first setting information recorded in the first firmware;
  storing, in a second memory of the second information processing device, second firmware for reproducing the first setting in setting processing of second hardware of the second information processing device based on the first setting information included in the generated data; and
  reproducing, by executing the second firmware, the first setting based on the first setting information in the setting processing of the second hardware,
  the second information processing device is configured not to start an operating system (OS) in the setting processing.

9. The method according to claim 8, wherein the data includes identification information of the first hardware, the identification information being recorded in the first firmware, and the method further comprises: determining, based on the identification information, whether the first setting is applicable to the setting processing of the second hardware.

10. The method according to claim 8, wherein the information system further includes a third memory configured to store the data, and the method further comprises: obtaining the data from the third memory by executing the second firmware.

11. The method according to claim 8, wherein the first setting information indicates a setting content and a setting procedure of the first hardware, and in the setting process, the setting content is reproduced according to the setting procedure by executing the second firmware.

12. The method according to claim 8, wherein the first firmware and the second firmware are each a basic input output system (BIOS).

13. The method according to claim 9, wherein the data further includes second setting information indicating a second setting of the first hardware before the first setting information is recorded in the first firmware, and the determining includes determining, based on the identification information and the second setting information, whether the second setting is applicable to the setting processing of the second hardware.

14. The method according to claim 12, wherein the BIOS is compliant with a unified extensible firmware interface (UEFI).

15. A non-transitory computer-readable storage medium storing a program that causes an information system including a first information processing device and a second information processing device, the process comprising:
  storing, in a first memory of the first information processing device, first firmware in which first setting information related to a first setting of first hardware of the first information processing device is recorded;
  generating, by executing the first firmware, data including the first setting information recorded in the first firmware;
  storing, in a second memory of the second information processing device, second firmware for reproducing the first setting in setting processing of second hardware of the second information processing device based on the first setting information included in the generated data; and
  reproducing, by executing the second firmware, the first setting based on the first setting information in the setting processing of the second hardware,
  the second information processing device is configured not to start an operating system (OS) in the setting processing.

16. The non-transitory computer-readable storage medium according to claim 15, wherein the data includes identification information of the first hardware, the identification information being recorded in the first firmware, and the process further comprises: determining, based on the identification information, whether the first setting is applicable to the setting processing of the second hardware.

17. The non-transitory computer-readable storage medium according to claim 15, wherein the information system further includes a third memory configured to store the data, and the process further comprises: obtaining the data from the third memory by executing the second firmware.

18. The non-transitory computer-readable storage medium according to claim 16, wherein the data further includes second setting information indicating a second setting of the first hardware before the first setting information is recorded in the first firmware, and the determining includes determining, based on the identification information and the second setting information, whether the second setting is applicable to the setting processing of the second hardware.

* * * * *